Sept. 4, 1956 H. U. GARRETT ET AL 2,761,465
VALVE
Filed March 20, 1953
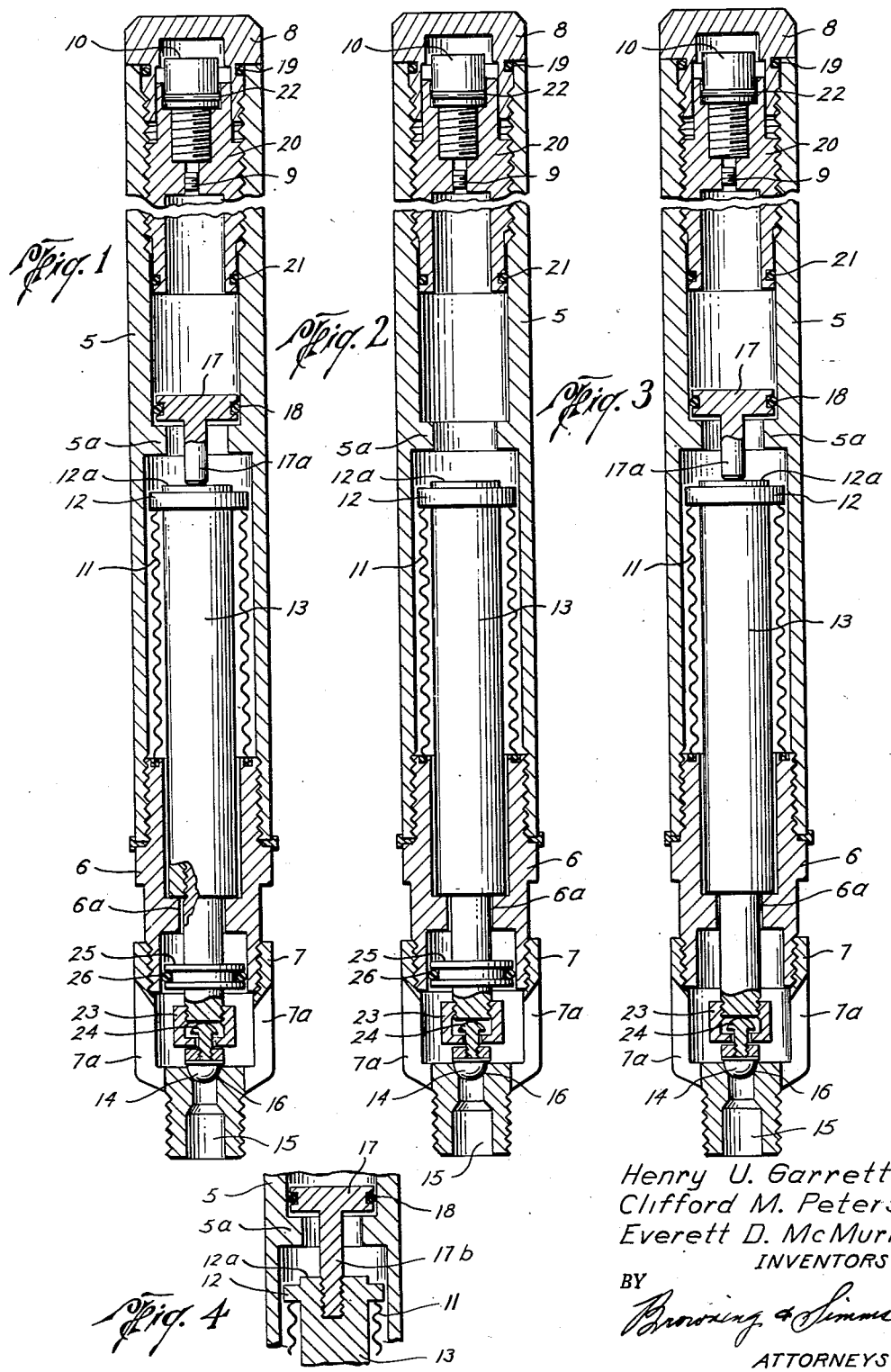
Henry U. Garrett
Clifford M. Peters
Everett D. McMurry
INVENTORS
BY
ATTORNEYS

United States Patent Office 2,761,465
Patented Sept. 4, 1956

2,761,465

VALVE

Henry U. Garrett, Clifford M. Peters, and Everett D. McMurry, Houston, Tex., assignors to Garrett Oil Tools, Inc., Houston, Tex., a corporation of Texas Application March 20, 1953, Serial No. 343,566

26 Claims. (Cl. 137—155)

This invention relates to improvements in pressure responsive valves and refers more particularly to valves of this character which rely upon a pressure responsive member forming a pressure chamber within the valve to provide for actuation of the valve in response to pressure variations in a control fluid to which the pressure responsive member is subjected, and is a continuation in part of our co-pending application, Serial No. 789,964, filed December 5, 1947, and now abandoned.

Valves of this invention are well adapted for use in gas lift operations in the production of petroleum from well bores and the description of the valve will be directed to its application in this particular field. It is to be understood that this is done by way of illustration and not by way of limitation.

Valves of this type have proven satisfactory in service as long as the pressure responsive member which is usually a bellows remains intact. However, in use the bellows often fail for one cause or another rendering the valves inoperable. Also, in the valves heretofore provided, there has been no easy way to vary the pressure charge of the pressure chamber in the field and the valves cannot be repaired in the field.

An object of this invention is to provide an economical rugged bellows type pressure responsive valve.

Another object is to provide a bellows type pressure responsive valve which will work efficiently even after rupture or other failure of the bellows.

A further object is to provide a bellows type pressure responsive valve in which the bellows when in predetermined expanded position is backed by a liquid to prevent distortion due to exposure of the bellows to excessive pressures regardless of the position of mounting of the valve.

Still another object is to provide a valve of the character described in which the pressure charge within the pressure chamber may be readily varied or adjusted.

A still further object is to provide a bellows type pressure responsive valve wherein an incompressible liquid backing prevents distortion of the bellows, when the valves are in storage or otherwise not in use, due to the high pressure within the pressure chamber of the valve.

Yet another object is to provide a bellows type valve of the class described, having two auxiliary seals such that the valve will continue to function even though two of the seals fail.

Another object of this invention is to provide a bellows type valve of the character described wherein the bellows is protected against distortion due to the charge within the pressure chamber and an incompressible liquid backing prevents distortion of the bellows due to exposure of the bellows to excessive pressures within the system in which the valve is installed.

Another object of this invention is to provide a valve of the pressure responsive type wherein the pressure responsive member is protected against excessive pressures regardless of the position of mounting of the valve.

Another object of this invention is to provide a valve of the pressure responsive type having a pressure responsive member protected against excessive pressure by one or more additional pressure responsive members and whose valve member will be held on its seat while the charge pressure within the valve exceeds the control pressure exteriorly of the valve even though all but one of the pressure responsive members fail.

Other and further objects of this invention will appear from the following description in which is set forth by way of example illustrative embodiments of this invention.

In the accompanying drawings which form a part of the instant specification and wherein like numerals designate like parts in the various views:

Fig. 1 is a longitudinal sectional view of a valve illustrating an embodiment of this invention;

Fig. 2 is a longitudinal sectional view of a modified form of this invention;

Fig. 3 is a longitudinal sectional view of another modified form of this invention; and Fig. 4 is a fragmentary section illustrating a modified form of the upper piston and guide of the Fig. 1 and Fig. 3 embodiments.

Referring to the drawings, and particularly to the Fig. 1 embodiment, the valve body or casing is shown as made up of several threaded together parts, namely, the pressure chamber cylinder 5, nipple 6, valve cage 7 and cap 8. The cap 8 is internally threaded to the upper end of nipple 6 and has a sliding seal therewith provided by O-ring 19 disposed in a peripheral groove in the cap. This provides a sealed housing for plug 20 threadedly carried within the cylinder. It will be noted that plug 20 is mounted for limited longitudinal movement within the cylinder to vary the volume of the pressure chamber provided by this assembly and bellows 11 to be later referred to. O-ring 21 in a peripheral groove at the lower end of the plug provides a sliding seal between the plug and cylinder. The plug has a central bore with valve core 9 therein for charging pressure to the pressure chamber. Stopper 10, carrying O-ring 22 and threaded within an enlarged bore in the plug, serves to positively seal this valved port. O-rings 19, 21 and 22 are so arranged as to trap substantially atmospheric pressure between the plug and cap. In operation the opposite side of these O-rings will be subjected to substantially elevated pressures. This pressure differential holds the O-rings in position to provide positive seals.

The pressure chamber may be formed within the valve casing by bellows 11 which is sealed at one end to the upper portion of nipple 6. The other end of the bellows is sealed to the head 12 of guide or stem 13. The bellows guide and head, in this embodiment of the invention, constitute a part of the connection between the bellows and the valve member 14 at the lower end of the guide. The valve member is operable to control flow through the passageway of the valve by seating in the outlet 15 at 16. To insure proper alignment of valve member 14 with the seat, the valve member has a universal connection with stem 13. This connection may be provided by sleeve 23 threaded to the lower end of the stem. This sleeve has an annular inturned flange through which pin 24 may be inserted and then threaded to the valve member. The rounded head of pin 24, together with the semi-spherical character of the valve member, permits sufficient re-alignment of the valve member relative to seat 16 to insure proper seating of the valve even though stem 13 and seat 16 are not in exact alignment. The valve cage has a plurality of inlet ports or slots 7a which communicate with outlet 15 to complete the passageway through the valve.

The portion of guide 13 which carries the valve stem has a free or loose connection through bore 6a of nipple 6 to permit flow of fluid or liquid therepast although the tolerance is closed enough so that guide 13 maintains proper alignment of the bellows.

In the Fig. 1 embodiment, the bellows 11 is protected from direct exposure to both the pressure charge within the pressure chamber and the pressure of the control fluid. Piston 17, mounted for reciprocal movement within the pressure chamber, is the pressure responsive member that is exposed to the pressure therein. This piston divides the chamber into two portions and has a sliding seal with the wall of the hollow casing or cylinder 5 which seal is provided by O-ring 18 lodged in a peripheral groove formed in the piston. The piston carries a force transmitting means in the form of a rigid spacer or link which assures the maintenance of a spaced relation between the bellows and piston. The link is in the form of depending rod 17a which abuts the raised portion 12a of head 12. This raised portion 12a is adapted to engage the underside of an apertured partition 5a when the bellows is flexed an amount to fully unseat valve member 14. This limits further movement of the bellows and provides a seal to entrap a liquid surrounding the bellows thereby providing an incompressible backing therefor that prevents distortion of the bellows due to excessive control fluid pressures. If the valve is to be mounted in an upright position, then only enough liquid need be provided above the bellows to insure filling of the space below partition 5a with the valve fully opened. However, an added feature of the invention is that the valve may be mounted in any position if the entire space surrounding link 17a and between the bellows and piston 17 is filled with liquid. Any suitable liquid may be used, but distilled water is preferred due to its cheapness and availability if the temperature conditions under which the valve will be employed permit its use. If extreme high or low temperature conditions are to be encountered, the liquid is selected that has a suitable boiling and freezing point as will be understood by those skilled in the art.

The bellows is also shielded from direct contact with the control fluid by a pressure responsive member shown as piston 25 carried by stem 13 in the enlarged bore of nipple 6 beneath bore 6a. O-ring 26, in a groove in the periphery of piston 25, provides a sliding seal with the wall of the casing or nipple. With this arrangement, the force due to the control fluid pressure is exerted against piston 25 and transmitted to head 12 through stem 13 and to piston 17 through link 17a, if it abuts head 12, or through the fluid or hydraulic medium between the bellows and piston if the link is raised somewhat from head 12. It is to be understood that in assembly of the valve, link 17a does not have to abut the head 12 or the raised portion 12a and usually will not. Only after failure of the seals provided by the bellows and piston 25, does the function of the link become important. Under these circumstances, the link provides a rigid spacer between valve 14 and piston 17 whereby the piston will be effective to hold the valve closed except under conditions of high control pressures. Referring back to piston 25, the space surrounding stem 13 and between this piston and the bellows is also preferably filled with liquid. This liquid provides an incompressible backing for the bellows protecting it from distortion due to excessive pressure differentials between the charge of the pressure chamber and the control pressure. The pressure chamber charge often may be as high as 800# per square inch and even higher and the control pressure, which is the pressure exterior of the valve casing, will often be atmospheric such as, for instance, when the valve is in storage, in transit to a point of installation, and occassionally even when installed. While bellows have been made that satisfactorily withstand this pressure differential between the pressure charge of the valve and atmospheric pressure, nevertheless this differential always imposes strain upon the bellows which in time weakens the bellows. By providing the incompressible liquid backing for the bellows, this particular cause of failure or weakening of the bellows is entirely eliminated. Another advantage of the piston 25 having a sliding seal with the valve casing is that debris is prevented from filling up the space or partially filling the space between the bellows and the guide or stem 13. Also, an auxiliary seal is provided so that the valve will continue to function in its normal manner even though the bellows does fail for some cause or other.

It will be apparent that the cross-sectional area of piston 25 should equal the effective area of the bellows when the chamber defined in part by bellows 11 and piston 25 is to be filled with liquid so as to provide a constant volume chamber at all operative positions of valve 14.

Assembly of the valve may be easily accomplished in a manner that is believed apparent from the drawings. Piston 17 is first inserted in cylinder 5 and the plug 20 is inserted in the end of the cylinder. A pressure charge may then be placed within the pressure chamber through the valve port 9 and the plug 22 secured in place. In this condition, the cylinder is turned to an upside down position and the part of the cylinder that is to be occupied by the bellows is filled with water or other suitable liquid. For most purposes, it is desirable to completely fill the space with water although, as heretofore pointed out, a lesser amount may be used. Assuming that the space is completely filled with water, the nipple containing the bellows and stem 13 is then threaded into the open end of cylinder 5. Insertion of this assembly into the cylinder will displace a considerable portion of the liquid which will leak through the threaded connection between the nipple and cylinder. As the nipple is tightened in place to form a seal, piston 17 will usually be forced upwardly toward plug 20 to a very slight extent. As heretofore pointed out, this slight displacement of piston 17 will not adversely effect the operation of the valve. The valve in this state of assembly is maintained in its upside down position and water or other suitable liquid is used to fill the space surrounding stem 13. Piston 25 is then threaded to stem 13 and will obviously displace some of the water or other liquid from the nipple. As the piston is tightened in place, slight flexure of bellows 11 may occur which will be accompanied by corresponding movement of piston 17. This again has been found to have no adverse effect upon the operation of the valve. The valve member is then assembled by placing pin 24 through the aperture in the end of sleeve 23. The valve member is then threaded to pin 24 and the sleeve is then secured to the lower end of stem 13. Valve cage 7 is then threaded onto the lower end of nipple 6 to complete the assembly.

The pressure charge within cylinder 5 should then be tested and if found to be inaccurate may be adjusted by axial adjustment of plug 20 which in turn is accomplished by rotation of the plug. When the pressure charge is adjusted, cap 8 is secured upon the upper end of cylinder 5 and the valve is now ready for installation.

From the foregoing description of the method of assembly, it is apparent that if in operation it becomes desirable or necessary to repair the valve by replacement of the bellows, nipple 6, piston and O-ring 25 and 26, or valve cage 7 this may be readily accomplished in the field. The piston 17 and O-ring 18 will preserve the pressure charge within the pressure chamber while these repairs are made. After the repairs are complete, the plug 20 may be manipulated to accurately adjust the pressure charge.

In operation, the valve may be installed in well equipment or any other desired installation. If the valve is to be installed in well equipment, this may be done in a manner more fully set out in United States Letters Patent No. 2,519,242, issued August 15, 1950 to Henry U. Garrett and Clifford M. Peters. In the interest of simplicity, a description of this installation and the operation of such an installation in well production equipment will not be repeated in this application.

Referring to the operation of the individual valve, in any installation, the control pressure has access to the underside of piston 25 and exerts an upward force in an axial direction upon the piston. This force is transmitted through stem 13 and head 12 tending to extend the bellows and is exerted against piston 17 through either the fluid or hydraulic connection between the bellows and piston or through link 17a in the event this link is in abutment with the raised portion 12a of the head. This force, due to the control pressure, is opposed by the force of the pressure charge acting against the upper surface of piston 17. When the force due to the control pressure exceeds the opposing force due to the pressure charge, then the position of the pressure responsive members is changed resulting in an elongation of the bellows. This movement of the pressure responsive members is effective to lift valve 14 from seat 16. When the pressure of the control fluid exceeds a predetermined amount, surface 12a abuts the underside of partition 5a to seal off the aperture therebetween. This abutment of the head against the partition limits further elongation of the bellows and, where the space between the bellows and the upper piston is not completely filled with liquid, it is important that a seal is provided which traps the liquid below partition 5a to provide an incompressible liquid backing for the bellows whereby, in event of failure or omission of piston 25 and seal 26, the bellows will not be distorted by further increase in the pressure of the control fluid. However, as heretofore indicated, it is preferable that the space between piston 17 and the bellows be completely filled with liquid in which instance any means for limiting movement of piston 17 past a predetermined position, without the provision of a sealed off portion of the space, will provide the incompressible liquid backing for the bellows protecting the same against excessive pressures of the control fluid. This makes it possible to mount the valve in any position.

The volume of the pressure chamber above piston 17 must be great enough to serve as the active portion of the pressure chamber and is that portion of the chamber that is charged with a predetermined pressure.

It is contemplated that link 17a may be connected to head 12, but this is not usually required. Such an arrangement will provide for positive actuation of valve 14 by the piston in event of total failure of the seals provided by piston 25 and bellows 11.

In the event the seal provided by O-ring 26 fails in operation, the bellows 11 still will remain in an active condition. The liquid backing on the underside of the bellows, when the valve is in operation, is not necessary to protect the bellows as usually the control fluid pressure will be substantially above atmospheric and the pressure differential across the bellows will not be great.

If in operation both the bellows and the seal provided by O-ring 26 fail still the pressure charge within the pressure chamber will be effective to maintain the valve closed as the link 17a will contact portion 12a of head 12 holding the stem and valve in a position to maintain the valve closed unless the force of the control fluid acting against the underside of the piston is great enough to move the piston 17 upwardly. Even then the piston 17, not having a positive connection with the head 12, will not raise stem 13 and the valve member from its seat. Thus, when the valves are employed as upper valves along a string of tubing, the failure of the bellows and the seal provided for the lower piston will not permit opening of these valves so that the operation of the well installation may continue as long as a seal for piston 17 remains intact. Inasmuch as this piston operates in a sealed chamber, until the bellows and the seal provided for piston 25 fail, the O-ring 18 has been found to work entirely satisfactorily and materially extends the useful life of such valves.

The life of O-ring 18 is also prolonged due to its protection against excessive pressure differentials between the pressure charge within the pressure chamber and the pressure of the control fluid. This is true because the surface 12a seals off the upper portion of the pressure chamber when it abuts against the underside of partition 5a so that excessive pressure is not encountered on the underside of the piston. Also, the piston is free to move upwardly in the pressure chamber until it abuts the lower edge of plug 20. For this reason, even though all seals below piston 17 fail, there will be no substantial pressure differential across O-ring 18 unless the control pressure substantially exceeds the pressure that would be required to force piston 17 into contact with the lower end of the plug. Such excessive control pressures will be rarely, if ever, encountered, except upon the installation of a string of flow tubing equipped with such valves in a well bore for oil production purposes as explained in the parent application. During this original installation, the seals provided by the bellows and O-ring 26 will be effective to shield piston 17 from such excessive pressures.

It is contemplated that valves of this invention may be constructed and employed wherein either one of the pistons 17 and 25 may be omitted.

For instance, in Fig. 2 there is illustrated a modified form of the invention which is identical with the Fig. 1 embodiment except that the upper piston 17 has been omitted. In Fig. 3 there is illustrated a further modification of the invention which is identical with the Fig. 1 embodiment except that lower piston 25 and seal ring 26 have been omitted. It is believed that the assembly and operation of these embodiments are apparent from the description pertaining to the Fig. 1 embodiment.

It is contemplated that the force transmitting means 17a may be operably connected to head 12 and Fig. 4 illustrates one means of making this connection between the piston 17 and the bellows. Link 17b which is somewhat longer than link 17a is threadedly connected to head 12 of guide 13 and maintains a constant spacing between piston 17 and bellows 11. When piston 17 and head 12 are so connected, the cross-sectional area of piston 17 is preferably equal to the effective area of the bellows so that the volume of the chamber defined in part by piston 17 and bellows 11 will remain constant at all operative positions of valve 14. In other words, piston 17 will be carried by the bellows 11 and the constant volume chamber therebetween may be filled with liquid to provide an incompressible backing for the bellows when movement of the piston is arrested as by engagement of the partition 5a by surface 12a of stem 13. It will be understood that with bellows 11 and piston 17 operably linked together, there is no necessity for providing a seal between surface 12a and partition 5a as the liquid protecting the bellows will be confined by piston 17 and the engagement of partition 5a by surface 12a will limit movement of piston 17. The Fig. 4 modification may be substituted in either the Fig. 1 or Fig. 3 embodiments for the disconnected piston 17.

When the piston 17 and bellows guide 13 are provided with a rigid connection as illustrated in Fig. 4 and a seal is not provided between surface 12a and partition 5a, the bellows may still be protected against distortion due to excessive pressure differentials by filling the space between piston 17 and bellows 11 with liquid. The pressure differential between the charge of fluid pressure and the control fluid pressure will be taken across piston 17 and O-ring 18. Thus, the bellows will be protected from the charge of fluid pressure by piston 17 and also from the control fluid pressure by the liquid confined by piston 17. This will be true regardless of which pressure is the greater. With this arrangement, piston 25 may be omitted, if desired, without exposing the bellows to a pressure differential when the charge pressure exceeds the ambient pressure to which the valve is exposed.

The lower piston would still be desirable in some installations to prevent the entry of sand or debris into the bellows cavity.

In the Fig. 4 embodiment the abutment of surface 12a against partition 5a need only serve as a means for limiting movement of the piston 17 and flexure of bellows 11. Other suitable stop means may be employed.

In assembling the valve, when the piston 17 is connected to head 12, piston 17 and nipple 6 with its associate guide and bellows assembly are inserted from opposite ends of cylinder 5 and the threaded connection between piston 17 and head 12 made up. The valve may then be turned to an inverted position and filled with liquid and the assembly completed in the same manner as when the piston 17 and bellows 11 are not rigidly connected except that the pressure chamber should be charged after nipple 6 has been secured to cylinder 5.

In making repairs or for any other reason, the pressure charge of any of the valves may be easily adjusted within substantial limits. The cap 8 is first removed and plug 20 is then rotated to adjust it axially of cylinder 5. Obviously this varies the volume of the pressure chamber to reduce or increase the pressure charge dependent upon the direction of longitudinal movement of the plug. The recess in the underside of the plug provides ample volume for the adjusted pressure chamber to insure a sensitive pressure responsive actuation of the valve.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pressure responsive valve having a hollow casing with a flow passageway therethrough and pressure responsive means operable to govern actuation of a valve member which controls flow through the passageway in response to pressure variations in a control fluid to which the pressure responsive means is exposed, said pressure responsive means sealing off a portion of the interior of the casing to provide a closed pressure chamber, the improvement which resides in the combination therewith of a pressure responsive member within the pressure chamber providing a seal with the casing to separate the pressure responsive means from a substantial portion of the pressure chamber, a charge fluid in said substantial portion of the pressure chamber, and means for transmitting force between the pressure responsive member and the pressure responsive means, said pressure responsive member being normally protected against exposure to the control fluid pressure by the pressure responsive means and exposed to the control fluid pressure upon failure of the pressure responsive means, said pressure responsive member, upon failure of the pressure responsive means, being operable to maintain the valve member seated while the control pressure is less than the charge fluid pressure.

2. A pressure responsive valve having a hollow casing with a flow passageway therethrough and bellows operable to govern actuation of a valve member which controls flow through the passageway in response to pressure variations in a control fluid to which the bellows is exposed, said bellows sealing off a portion of the interior of the casing to provide a closed pressure chamber, the improvement which resides in the combination therewith of a pressure responsive member within the pressure chamber providing a seal with the casing to separate the bellows from a substantial portion of the pressure chamber, a charge fluid in said substantial portion of the pressure chamber, and means for transmitting force between the pressure responsive member and the bellows, said pressure responsive member being normally protected against exposure to the control fluid pressure by the bellows and exposed to the control fluid pressure upon failure of the bellows, said pressure responsive member, upon failure of the bellows, being operable to maintain the valve member seated while the control pressure is less than the charge fluid pressure, and means carried in part by the bellows and in part by the casing wall within the pressure chamber adapted with the valve member in open position to provide a seal within the pressure chamber between the pressure responsive member and the bellows.

3. A pressure responsive valve having a hollow casing with a flow passageway therethrough and a bellows operable to govern actuation of a valve member which controls flow through the passageway in response to pressure variations in a control fluid to which the bellows is exposed, said bellows sealing off a portion of the interior of the casing to provide a closed pressure chamber, the improvement which resides in the combination therewith of a piston within the pressure chamber, O-ring sealing means providing a sliding seal between the piston and the chamber wall and sealing off a substantial portion of the chamber from the bellows, a charge fluid in said substantial portion of the pressure chamber, and force transmitting means between the piston and the bellows, said piston being normally protected against exposure to the control fluid pressure by the bellows and exposed to the control fluid pressure upon failure of the bellows, said pressure responsive member, upon failure of the bellows, being operable to maintain the valve member seated while the control pressure is less than the charge fluid pressure.

4. A pressure responsive valve having a hollow casing with a flow passageway therethrough and a bellows operable to govern actuation of a valve member which controls flow through the passageway in response to pressure variations in a control fluid to which the bellows is exposed, said bellows sealing off a portion of the interior of the casing to provide a pressure chamber, the improvement which resides in the combination therewith of a pressure responsive member within the pressure chamber providing a seal with the casing to separate the bellows from a substantial portion of the pressure chamber, means for transmitting force between the pressure responsive member and the bellows, said pressure responsive member being normally protected against direct exposure to the control fluid pressure by the bellows and being directly exposed to the control fluid pressure upon failure of the bellows, and means carried in part by the bellows and in part by the casing wall within the pressure chamber adapted with the valve member in open position to provide a seal within the pressure chamber between the pressure responsive member and bellows and sufficient liquid within the pressure chamber so that when the bellows is in position with the valve member in open position, that portion of the pressure chamber defined in part by the bellows and the last mentioned seal is completely filled with said liquid.

5. A pressure responsive valve having a hollow casing with a flow passageway therethrough and a pressure responsive means operable to govern actuation of a valve member which controls flow through the passageway in response to pressure variations in a control fluid to which the pressure responsive means is exposed, said pressure responsive means sealing off a portion of the interior of the casing to provide a pressure chamber, the improvement which resides in the combination therewith of a piston within the pressure chamber, O-ring sealing means providing a seal between the piston and the chamber wall sealing off a substantial portion of the chamber from the pressure responsive means, and force transmitting means between the piston and the pressure responsive means, said piston being normally protected against exposure to the control fluid pressure by the pressure responsive means and exposed to the control fluid pressure upon failure of the pressure responsive means, and a liquid completely filling that portion of the pressure chamber defined in part by the pressure responsive means and the piston.

6. A pressure responsive valve having a hollow casing with a flow passageway therethrough and a bellows operable to govern actuation of a valve member which controls flow through the passageway in response to pressure variations in a control fluid to which the bellows is exposed, said bellows sealing off a portion of the interior of the casing to provide a closed pressure chamber, the improvement which resides in the combination therewith of a piston within the pressure chamber, O-ring sealing means providing a seal between the piston and the chamber wall and sealing off a substantial portion of the chamber from the bellows, a charge fluid in said substantial portion of the pressure chamber, and force transmitting means between the piston and the bellows, said piston being normally protected against exposure to the control fluid pressure by the bellows and exposed to the control fluid pressure upon failure of the bellows, an apertured partition within the pressure chamber between the piston and bellows, said pressure responsive member, upon failure of the bellows, being operable to maintain the valve member seated while the control pressure is less than the charge fluid pressure, the force transmitting means between the piston and the bellows extending through the aperture of the partition, and a part carried by the bellows and adapted to abut the partition to seal the aperture thereof when the bellows is biased into said casing to effect opening of the valve member.

7. A pressure responsive valve having a hollow body, a passageway in the body with a valve member operable to control flow through the passageway, a bellows having one end sealingly secured within the body to provide a sealed off variable volume pressure chamber within the body separate from the passageway with means for the introduction of a fluid charge into the pressure chamber, an operable linkage between the valve member and the end of the bellows not connected to the body whereby the valve member will be actuated in response to movement of the free end of the bellows, a piston having a cross-sectional area equal to the effective area of the bellows mounted within the pressure chamber in sealing and sliding engagement with the inner wall of the chamber, a force transmitting linkage between the bellows and piston maintaining a constant spaced relationship therebetween to provide a constant volume sealed off space, and a liquid completely filling the constant volume sealed off space to provide an incompressible backing for the bellows.

8. A pressure responsive valve having a hollow body, a passageway in the body with a valve member operable to control flow through the passageway, a bellows having one end sealingly secured within the body to provide a sealed off variable volume pressure chamber within the body separate from the passageway with means for the introduction of a fluid charge into the pressure chamber, an operable linkage between the valve member and the end of the bellows not connected to the body whereby the valve member will be actuated in response to movement of the free end of the bellows, a piston having a cross-sectional area equal to the effective area of the bellows mounted intermediate the free end of the bellows and the passageway and having a sliding seal with the inner wall of the body in the form of an O-ring sealing assembly, a force transmitting linkage between the bellows and piston maintaining a constant spaced relationship therebetween to provide a constant volume sealed off space.

9. A pressure responsive valve having a hollow body, a passageway in the body with a valve member operable to control flow through the passageway, a bellows having one end sealingly secured within the body to provide a sealed off variable volume pressure chamber within the body separate from the passageway with means for the introduction of a fluid charge into the pressure chamber, an operable linkage between the valve member and the end of the bellows not connected to the body whereby the valve member will be actuated in response to movement of the free end of the bellows, a piston having a cross-sectional area equal to the effective area of the bellows mounted within the pressure chamber and having a sliding seal with the inner wall of the pressure chamber, said seal being provided by an O-ring between the piston and said inner wall of the pressure chamber, a rigid force transmitting linkage between the bellows and the piston maintaining a constant spaced relationship therebetween to provide a constant volume sealed off space, and a liquid completely filling the constant volume sealed off space to provide an incompressible backing for the bellows.

10. A pressure responsive valve having a hollow body, a passageway in the body with a valve member operable to control flow through the passageway, a bellows having one end sealingly secured within the body to provide a sealed off variable volume pressure chamber within the body separate from the passageway with means for the introduction of a fluid charge into the pressure chamber, an operable linkage between the valve member and the end of the bellows not connected to the body whereby the valve member will be actuated in response to movement of the free end of the bellows, a piston having a cross-sectional area equal to the effective area of the bellows mounted within the pressure chamber in sealing and sliding engagement with the inner wall of the chamber, a force transmitting linkage between the bellows and piston maintaining a constant spaced relationship therebetween to provide a constant volume sealed off space, means limiting the travel of the piston, and a liquid completely filling the constant volume sealed off space to provide an incompressible backing for the bellows.

11. A pressure responsive valve comprising a hollow casing, a bellows and a piston sealingly mounted in spaced apart relationship within the casing to provide a variable volume pressure chamber within the casing and a constant volume sealed off space between the bellows and piston, said bellows being arranged as to be exposed to a variable pressure control fluid which exists exteriorly of the casing and said piston being exposed to the interior of the pressure chamber, a linkage between the bellows and piston maintaining a constant spaced relationship therebetween, a linkage operably connecting the bellows with a valve means controlling flow through said valve to actuate the valve means in response to movement of the bellows and piston, means limiting the travel of the piston, and a liquid completely filling the constant volume sealed off space to provide an incompressible backing for the bellows.

12. A pressure responsive valve having a hollow body, a passageway in the body with a valve member operable to control flow through the passageway, a chamber in the body separated from the passageway by a bellows sealingly secured within the body, an operable linkage between the valve member and the free end of the bellows whereby the valve member will be actuated in response to movement of the free end of the bellows, a piston having a cross-sectional area equal to the effective area of the bellows carried by the bellows and mounted within the chamber in sealing and sliding engagement with the inner wall of the chamber to divide the chamber into a constant volume portion and variable volume portion, means limiting the travel of the piston, a valved inlet in the variable volume portion for the introduction of a fluid charge, and a liquid completely filling the constant volume portion to provide an incompressible backing for the bellows.

13. A pressure responsive valve having a hollow casing with a flow passageway therethrough and a pressure responsive means operable to govern actuation of a valve member which controls flow through the passageway in response to pressure variations in a control fluid to which the pressure responsive means is exposed, said pressure responsive means sealing off a portion of the interior of the casing to provide a pressure chamber, the improvement which resides in the combination therewith of a plug threaded in a cylindrical portion of the casing, said cylindrical portion communicating with the pressure chamber, a surface of the plug defining in part the pressure chamber, a seal between the plug and the casing of the type dependent upon a pressure differential thereacross for its sealing characteristics providing for relative movement between the plug and casing, whereby the plug may be moved axially by rotation thereof to adjust the pressure charge within the pressure chamber, and a pressure responsive member within the pressure chamber sealingly engaging the casing to separate the pressure responsive means from the portion of the pressure chamber which includes the plug and prevent escape of the charge pressure fluid when the seal between the pressure responsive means and casing is destroyed.

14. A pressure responsive valve having a hollow casing with a flow passageway therethrough and a bellows operable to govern actuation of a valve member which controls flow through the passageway in response to pressure variations in a control fluid to which the bellows is exposed, said bellows sealing off a portion of the interior of the casing to provide a pressure chamber, the improvement which resides in the combination therewith of a plug threaded in a cylindrical portion of the casing, said cylindrical portion communicating with the pressure chamber, a surface of the plug defining in part the pressure chamber, a seal between the plug and the casing of the type dependent upon a pressure differential thereacross for its sealing characteristics providing for relative movement between the plug and casing, whereby the plug may be moved axially by rotation thereof to adjust the pressure charge within the pressure chamber, a piston slidingly and sealingly engaging the casing to separate the bellows from the portion of the pressure chamber which includes the plug, and means limiting the travel of the piston to retain the piston within the chamber and prevent escape of the charge pressure fluid when the seal between the bellows and casing is destroyed.

15. A pressure responsive valve having a hollow casing with a flow passageway therethrough and a bellows operable to govern actuation of a valve member which controls flow through the passageway in response to pressure variations in a control fluid to which the bellows is exposed, said bellows sealing off a portion of the interior of the casing to provide a pressure chamber, the improvement which resides in the combination therewith of a plug threaded in a cylindrical portion of the casing, said cylindrical portion communicating with the pressure chamber, a surface of the plug defining in part the pressure chamber, an O-ring seal between the plug and the casing providing for relative movement between the plug and casing, whereby the plug may be moved axially by rotation thereof to adjust the pressure charge within the pressure chamber, a piston slidingly and sealingly engaging the casing to separate the bellows from the portion of the pressure chamber which includes the plug, means limiting the travel of the piston to retain the piston within the chamber and prevent escape of the charge pressure fluid when the seal between the bellows and casing is destroyed, and a cap secured to the cylindrical portion of the casing exteriorly of the plug with an O-ring seal between the casing and cap, the pressure charge within the pressure chamber being greater than the pressure between the plug and cap.

16. An actuating mechanism for a pressure responsive valve having a hollow casing, the mechanism comprising separate pressure responsive members within the casing providing a variable volume sealed pressure chamber within the casing and a constant volume sealed space between the pressure responsive members, a charge of resilient fluid pressurizing said pressure chamber, one of the pressure responsive members being exposed to the force of a variable pressure control fluid and the other pressure responsive member being exposed to the pressure of said fluid pressurizing the pressure chamber, the pressure responsive members being urged toward each other by said pressures, a rigid linkage capable of maintaining the pressure responsive members in spaced relation so that movement of one of the pressure responsive members, occasioned by pressure variations in the control fluid, is accompanied by corresponding movement of the other pressure responsive member, one of the pressure responsive members being operably connectible with the valve means for actuation thereof in response to said movement of the pressure responsive member.

17. An actuating mechanism for a pressure responsive valve having a hollow casing, the mechanism comprising separate pressure responsive members within the casing providing a variable volume sealed pressure chamber within the casing and a constant volume sealed space between the pressure responsive members, a liquid completely filling the space between the pressure responsive members, one of the pressure responsive members being situated as to be exposed to the force of a variable pressure control fluid exteriorly of the casing and the other pressure responsive member being exposed to the interior of the pressure chamber, the pressure responsive members being urged toward each other by said pressures, a rigid linkage capable of maintaining the pressure responsive members in spaced relation so that movement of one of the pressure responsive members, occasioned by pressure variations in the control fluid, is accompanied by corresponding movement of the other pressure responsive member, one of the pressure responsive members being operably connectible with the valve means for actuation thereof in response to said movement of the pressure responsive members.

18. An actuating mechanism for a pressure responsive valve having a hollow casing, the mechanism comprising separate pressure responsive members in the form of a bellows and a piston sealingly mounted within the casing to provide a variable volume pressure chamber within the casing and a constant volume sealed off space therebetween, one of the pressure responsive members being situated as to be exposed to a variable pressure control fluid exteriorly of the casing and forming a seal across said casing to prevent intrusion of control fluid into said chamber, and the other pressure responsive member being exposed to the interior of the pressure chamber, the pressure responsive members being urged toward one another by said pressure, a linkage operable to maintain the pressure responsive members in spaced relation, so that flexure of the bellows is accompanied by corresponding movement of the piston, one of the pressure responsive members being operably connectible with a valve means to actuate the valve means in response to said movement of the pressure responsive members, whereby upon failure of the seal provided by the pressure responsive member exposed to the control fluid, the other pressure responsive member will be exposed thereto and will be operable to maintain the valve means closed while the control pressure is below a predetermined value.

19. An actuating mechanism for a pressure responsive valve having a hollow casing, which comprises, in combination, separate pressure responsive members comprising a bellows and a piston sealingly mounted within the casing to provide a variable volume pressure chamber within the casing and a constant volume sealed off space therebetween, a liquid completely filling the space between the pressure responsive members, one of the pressure responsive members being situated so as to be exposed to a variable pressure control fluid exteriorly of the casing and the other being exposed to the interior of the pressure chamber, the pressure responsive members being urged toward one another by said pressure, a linkage operable to maintain the pressure responsive members in spaced relation, so that flexure of the bellows is accompanied by corresponding movement of the piston, one of the pressure responsive members being operably connectible with a valve means to actuate the valve means in response to said movement of the pressure responsive members, whereby upon failure of the seal provided by the pressure responsive member exposed to the control fluid, the other pressure responsive member will be exposed thereto and will be operable to maintain the valve means closed while the control pressure is below a predetermined value.

20. A pressure responsive valve comprising a hollow casing with a flow passage therethrough, valve means controlling flow through the passage, actuating mechanism for effecting opening or closing of said valve means in response to pressure variations of a control fluid including a bellows sealing off a variable volume portion of the interior of the hollow casing and a second pressure responsive member having a sliding seal with the interior of the casing providing an auxiliary seal for the sealed off portion of the hollow casing, means for subjecting the bellows and pressure responsive member to the force of a variable pressure control fluid to effect flexure of the bellows and corresponding movement of the pressure responsive member in response to pressure variations in the control fluid, and means operable upon flexure of the bellows to actuate the valve means.

21. Actuating mechanism for a pressure responsive valve having a hollow casing, the mechanism comprising a bellows having one end sealingly secured to the casing to provide a sealed chamber within the casing, a linkage carried by the free end of the bellows, said linkage being adaptable to actuate a valve member, a piston carried by the linkage and having a moving seal with the casing, and liquid completely filling the space surrounding the linkage between the bellows and piston, said piston having a surface exposed in operation to a variable pressure control fluid, whereby the piston and bellows move as a unit in response to pressure variations of the control fluid and the liquid provides an incompressible backing for the bellows.

22. Actuating mechanism for a pressure responsive valve having a hollow casing, the mechanism comprising a bellows having one end sealingly secured to the casing to provide a sealed chamber within the casing, pistons within the casing on both sides of the bellows and having a sliding seal with the casing, force transmitting means between the bellows and each of the pistons adapted to hold the bellows and pistons in spaced relation and adapted to be operably connectible to a valve member for actuation thereof, and liquid filling the spaces surrounding the force transmitting means and between the bellows and each of the pistons, one of the pistons being exposed to a pressure charge within the sealed chamber of the casing and the other exposed to a variable pressure control fluid exteriorly of the casing whereby the bellows and pistons will be actuated as a unit in response to pressure variations in the control fluid and the bellows will be protected by incompressible liquid backings from distortion due to excessive pressure differentials across the bellows-pistons unit.

23. The apparatus of claim 22 in combination with an apertured partition within said casing between said bellows and said piston exposed to said pressure charge, the linkage between said bellows and last said piston extending through the aperture of the partition and a part carried by the bellows and adapted to abut the partition to seal the aperture thereof when the bellows is in a flexed condition to effect opening of the valve member.

24. A pressure responsive valve having a hollow casing with a flow passageway therethrough with a valve member controlling flow through said passageway, the combination therewith of a bellows sealing off a portion of said casing to provide a pressure chamber, a piston within and having a sliding seal with said casing and positioned on the side of said bellows remote from said pressure chamber to provide a sealed chamber between the piston and the bellows, and means interconnecting said bellows piston and valve member for movement as a unit to move said valve member between seated and unseated positions responsive to variations in a control pressure acting on said piston.

25. A pressure responsive gas lift valve comprising a hollow casing with a flow passageway therethrough and a valve member controlling flow through said passageway, a piston slidable within said casing, seal means between the piston and casing sealing off with the piston a portion of said casing to provide a pressure chamber therein adapted to contain a charge of resilient pressure fluid to urge the piston in one direction, means within said casing on the side of said piston opposite said pressure chamber for retaining a liquid on said opposite side of said piston in contact with said seal means, means interconnecting said piston, retaining means and valve member for movement as a unit to move said valve member between open and closed positions responsive to variations in a control pressure acting on said piston, said interconnecting means providing a chamber between said piston and retaining means for said liquid, and liquid in said chamber.

26. A pressure responsive gas lift valve which comprises a hollow casing with a flow passageway therethrough, first and second pistons slidably mounted in the casing and each having a sliding seal with the casing so that the first piston seals off a portion of the interior of the casing to provide a pressure charge chamber and so that the first and second pistons together seal off another portion of the interior of the casing to provide an intermediate chamber therebetween, said second piston being exposed to a control pressure fluid exteriorly of the casing, a valve member controlling flow through said passageway, and means interconnecting said first and second pistons and said valve member for movement thereof as a unit to move said valve member between open and closed positions responsive to variations in a control pressure acting on said second piston.

No references cited.